US009908050B2

United States Patent
Kohout

(10) Patent No.: US 9,908,050 B2
(45) Date of Patent: Mar. 6, 2018

(54) SYSTEM AND METHOD FOR IMAGE RECOGNIZED CONTENT CREATION

(75) Inventor: Robert Kohout, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1541 days.

(21) Appl. No.: 12/804,788

(22) Filed: Jul. 28, 2010

(65) Prior Publication Data

US 2012/0028694 A1  Feb. 2, 2012

(51) Int. Cl.
| | | |
|---|---|---|
| *A63F 13/00* | (2014.01) | |
| *A63F 13/65* | (2014.01) | |
| *A63F 13/213* | (2014.01) | |
| *A63F 13/63* | (2014.01) | |
| *A63F 13/42* | (2014.01) | |
| *A63F 13/803* | (2014.01) | |

(52) U.S. Cl.
CPC .......... *A63F 13/65* (2014.09); *A63F 13/213* (2014.09); *A63F 13/42* (2014.09); *A63F 13/63* (2014.09); *A63F 13/803* (2014.09); *A63F 2300/1093* (2013.01); *A63F 2300/6018* (2013.01); *A63F 2300/6045* (2013.01); *A63F 2300/8017* (2013.01)

(58) Field of Classification Search
USPC ........ 463/6, 16, 37, 5, 7; 382/100, 165, 209, 382/305
See application file for complete search history.

(56) References Cited

U.S. PATENT DOCUMENTS

| | | | | |
|---|---|---|---|---|
| 2008/0009348 | A1* | 1/2008 | Zalewski et al. | 463/40 |
| 2008/0220867 | A1* | 9/2008 | Zalewski et al. | 463/37 |
| 2009/0009348 | A1* | 1/2009 | Mizuo | G08B 17/113 340/630 |
| 2009/0147003 | A1* | 6/2009 | Do | G06T 15/205 345/427 |
| 2009/0208129 | A1* | 8/2009 | Shimodaira | G06T 5/002 382/264 |
| 2009/0231441 | A1* | 9/2009 | Walker et al. | 348/207.1 |
| 2010/0257252 | A1* | 10/2010 | Dougherty et al. | 709/217 |
| 2011/0035662 | A1* | 2/2011 | King et al. | 715/273 |

(Continued)

FOREIGN PATENT DOCUMENTS

WO  WO 2005084339 A2 *  9/2005

*Primary Examiner* — Dmitry Suhol
*Assistant Examiner* — Brandon Gray
(74) *Attorney, Agent, or Firm* — Farjami & Farjami LLP

(57) ABSTRACT

There is provided a system and method for image recognized content creation. There is provided a method comprising capturing an image from a camera, analyzing the image to recognize a plurality of elements, converting the plurality of elements into custom content data, and executing an interactive application using the custom content data. In one embodiment, the interactive application may comprise a racing video game, and the image may comprise a racetrack layout for use in the racing video game. Thus, a user can provide a racetrack by drawing simple lines and curves on a piece of paper, which are detected by the camera and converted into valid data assets for the video game. In this manner, even young children can leverage common drawing skills using familiar physical drawing implements for quick and simplified content creation, bypassing the need to use complex, tedious, and proprietary conventional on-screen user interfaces.

16 Claims, 4 Drawing Sheets

(56) References Cited

U.S. PATENT DOCUMENTS

2011/0275432 A1* 11/2011 Lutnick et al. ............... 463/25
2011/0281630 A1* 11/2011 Omar ............................ 463/17
2011/0295693 A1* 12/2011 Clavin et al. ............. 705/14.66

* cited by examiner

SYSTEM AND METHOD FOR IMAGE RECOGNIZED CONTENT CREATION

BACKGROUND OF THE INVENTION

1. Field of the Invention

The present invention relates generally to image analysis. More particularly, the present invention relates to image analysis for interactive applications.

2. Background Art

Interactive applications may include significant support for the creation of user-generated content. For example, video game applications may provide graphics editors to customize avatar appearances, level editors to design custom stages, music editors to compose new music, and other content creation tools. In this manner, users can enjoy the creative process of generating custom content. Additionally, by adding network services to the interactive application, users can easily distribute their creations to other users and participate in a larger development community. Thus, the value and shelf life of the interactive application can be extended without requiring significant additional work on the part of the application developers.

Unfortunately, there is often a steep learning curve associated with such content creation tools. Moreover, interfaces for such creation tools tend to be created ad-hoc and may not be uniform across different publishers and developers, rendering user skills developed for one creation tool potentially useless for another creation tool. Additionally, such interfaces often force users to create content using piecemeal, laborious, time intensive processes, often tailored towards ease of programming and implementation for developers rather than usability for end users. As a result, even the most dedicated users of the application may be deterred from creating custom content, thereby reducing the value of the application for users.

Accordingly, there is a need to overcome the drawbacks and deficiencies in the art by providing a way to create customized content for interactive applications in a simplified and user-friendly manner.

SUMMARY OF THE INVENTION

There are provided systems and methods for image recognized content creation, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for image recognized content creation. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
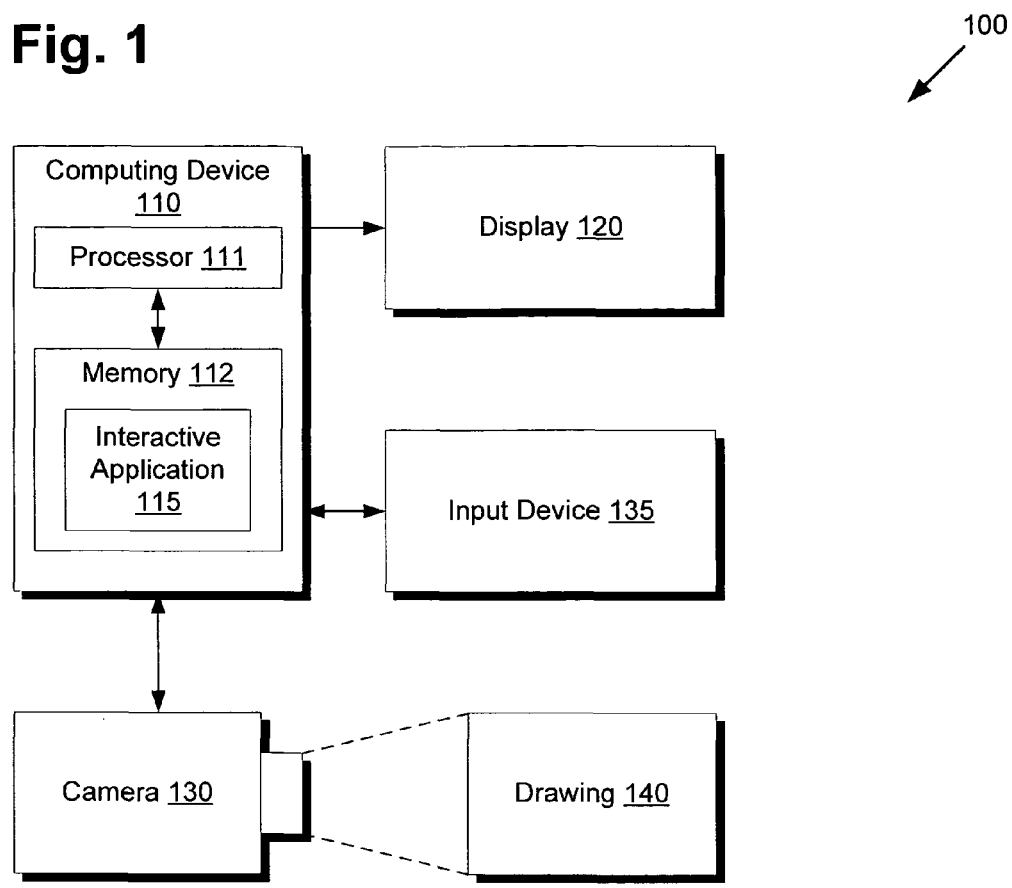
FIG. 1 presents a diagram of a system for image recognized content creation, according to one embodiment of the present invention.

FIG. 1 presents a diagram of a system for image recognized content creation, according to one embodiment of the present invention. Diagram 100 of FIG. 1 includes computing device 110, display 120, camera 130, input device 135, and drawing 140. Interactive device 110 includes processor 111 and memory 112. Memory 112 includes interactive application 115.

Computing device 110 may comprise, for example, a desktop or notebook computer, a video game console, a handheld game system, a mobile phone, or another computing device capable of interfacing with display 120, camera 130, and input device 135. Processor 111 of computing device 110 may then execute, in memory 112, interactive application 115, which may as a non-limiting example comprise a video game application such as a racing game. Camera 130 may then capture an image of drawing 140, provided by the user of computing device 110, for use in interactive application 115. For example, drawing 140 may comprise a piece of paper with a hand-drawn racetrack for use as a custom racetrack in interactive application 115. Drawing 140 may be created using any drawing tools available to the user, including but not limited to pens, pencils, crayons, paintbrushes and other tools. After interactive application 115 analyzes and converts drawing 140 into a corresponding custom track layout, which may be stored in memory 112, then the user may use input device 135 and display 120 to adjust the custom track layout or to play a race using the custom track layout.

Figure 2:
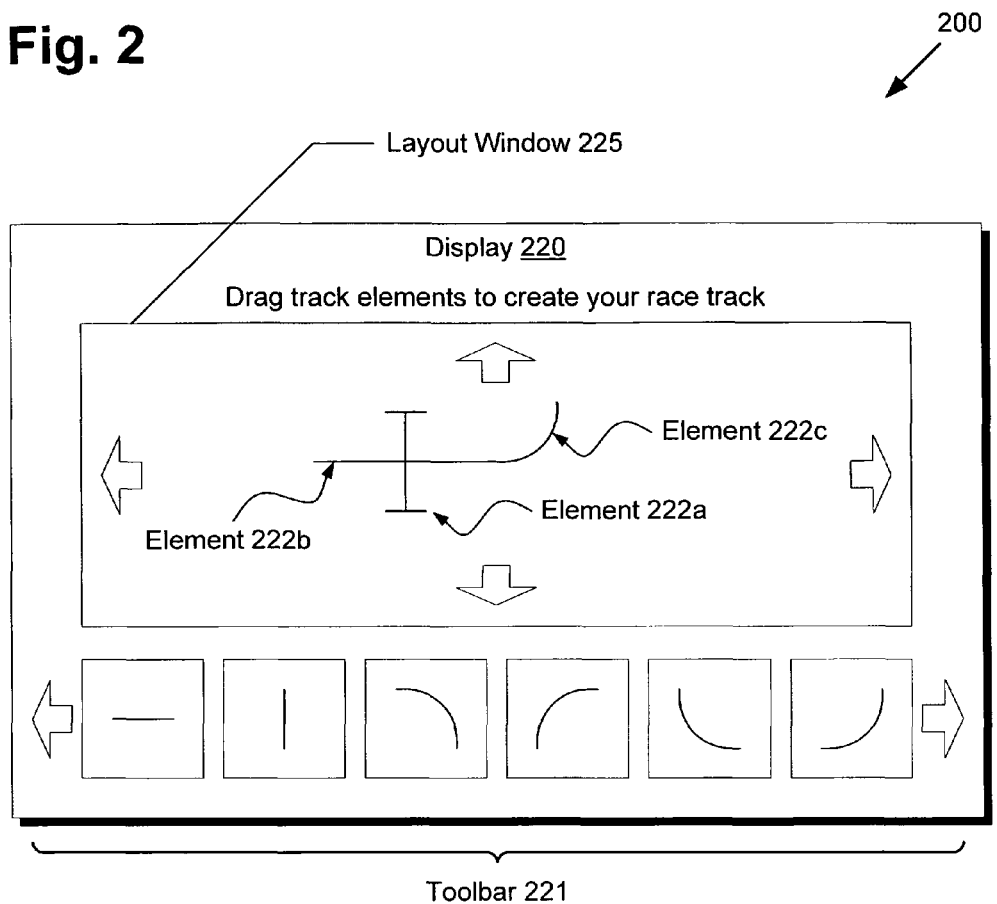
FIG. 2 presents a diagram of a conventional user interface for content creation.

Moving to FIG. 2, FIG. 2 presents a diagram of a conventional user interface for content creation. Display 220 includes toolbar 221 and layout window 225. Layout window 225 includes elements 222a, 222b, and 222c. Display 220 of FIG. 2 may correspond to display 120 of FIG. 1.

As shown in FIG. 2, a conventional user interface may require the user to select elements piece by piece from toolbar 221 to generate a custom racetrack. As shown in layout window 225, element 222a representing a starting line, element 222b representing a straight track segment, and element 222c representing a curved track segment are already in place. However, to complete the custom racetrack, the user will have to continue selecting many more elements from toolbar 221, manually placing them in the proper location within layout window 225. Since display 220 has limited screen real estate, the user may also be required to pan within layout window 225 and scroll through toolbar 221 using the shown navigation arrows, further slowing down the creation process. This method of creating custom racetracks may be straightforward for developers to implement, but the time and effort required from users may deter even the most dedicated user from creating custom racetracks. Since conventional creation tools are often difficult or inconvenient to use, it is often difficult to develop and maintain a strong development community for user-generated content, which is a strong asset and selling point for many interactive applications such as video games.

Figure 3:
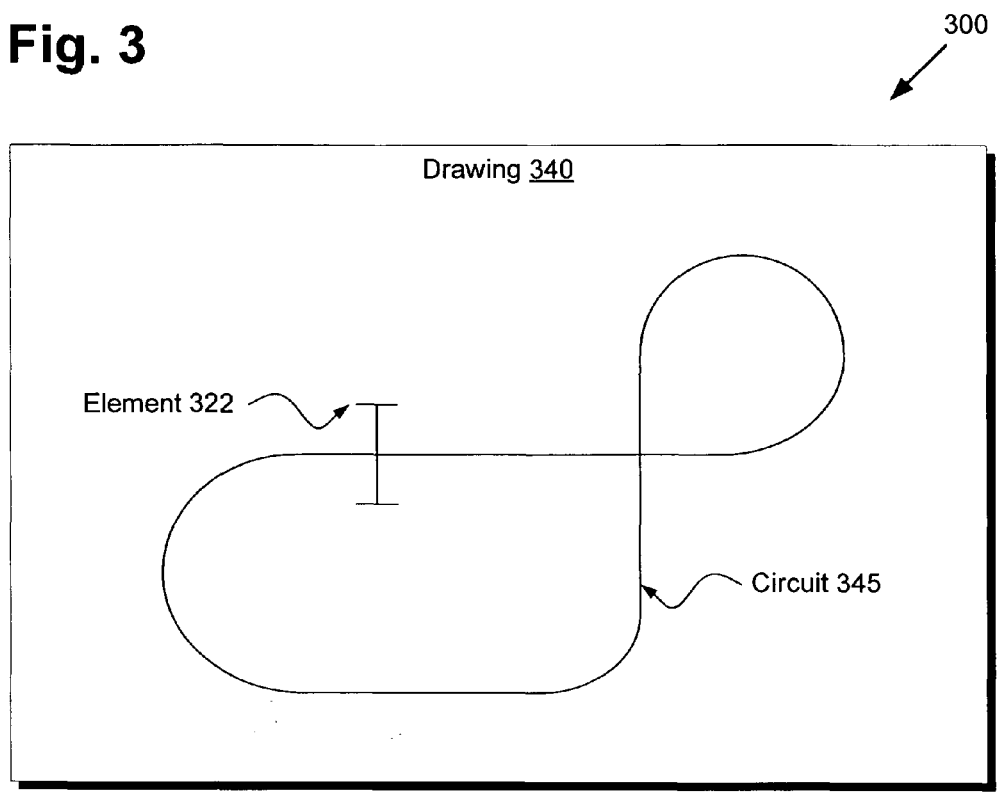
FIG. 3 presents a diagram of an image for use with image recognized content creation, according to one embodiment of the present invention.

Moving to FIG. 3, FIG. 3 presents a diagram of an image for use with image recognized content creation, according to one embodiment of the present invention. Diagram 300 of FIG. 3 includes drawing 340. Drawing 340 includes element 322 and circuit 345. Drawing 340 may correspond to drawing 140 from FIG. 1. Element 322 may correspond to element 222a from FIG. 2.

As previously discussed, the user may provide a pen or pencil drawing on a piece of paper, which may include the contents of drawing 340. In this manner, users can rely on common shape drawing skills using familiar physical drawing implements rather than being forced to use complex, proprietary, application specific customization tools in an abstract, non-tangible manner. As shown by drawing 340 in FIG. 3, the user may draw a racetrack using simple lines and curves to form a closed circuit track, or circuit 345. Element 322 may be added by the user to indicate the start and finish line. Thus, the user is only required to provide a quick sketch of a loop, a figure eight, or any other combination of lines and curves, allowing even young children to create their own custom racetracks in a matter of minutes.

Besides drawings on paper, any reference that may be captured with camera 130 of FIG. 1 may be utilized. Thus, other embodiments of drawing 340 may for example include a racetrack layout printed in a magazine or shown on a computer display, a mobile device screen, or a television display. In this manner, existing references may also be utilized such as famous racetracks reproduced in racing websites or magazines.

Once drawing 340, corresponding to drawing 140 in FIG. 1, is captured by camera 130 of computing device 110, interactive application 115 executing on processor 111 may perform image analysis to convert the raw image data into a valid application data asset. For example, the pixels of the raw image data comprising circuit 345 may be converted into a spline comprising a linked list of line segments and Bezier curves. Alternatively, circuit 345 may be divided into segment areas that are matched to the closest valid track segment available. To compensate for imperfect drawings, lines may be forced straight and curves may be smoothed to mitigate the effects of unsteady hands or to adjust to drawing skill level. The user may optionally adjust the parameters of analysis according to preference, for example to bypass automatic curve compensation.

Additionally, track properties may be indicated by various defined attributes of drawing 340. For example, line drawing thickness for circuit 345 may indicate the width or number of lanes for the racetrack. Line or foreground colors for circuit 345 and surrounding background colors in drawing 340 may indicate terrain materials, such as black for pavement, brown for dirt, and green for grass. Defined symbols may also indicate special elements or properties of the racetrack, such as the "I" shape of element 322 indicating the start and finish line. To provide another example, if the intersection shown in circuit 345 is actually an overpass at different heights, such a property might be indicated using a half-circle.

Furthermore, while drawing 340 is shown using a simple two-dimensional bird's eye view, alternative embodiments may support drawings drawn three-dimensionally. For example, drawing 340 may be drawn as a projection such as an isometric projection or from a perspective such as a three-point perspective. Thus, more complicated racetracks with varying heights may be supported.

Figure 4:
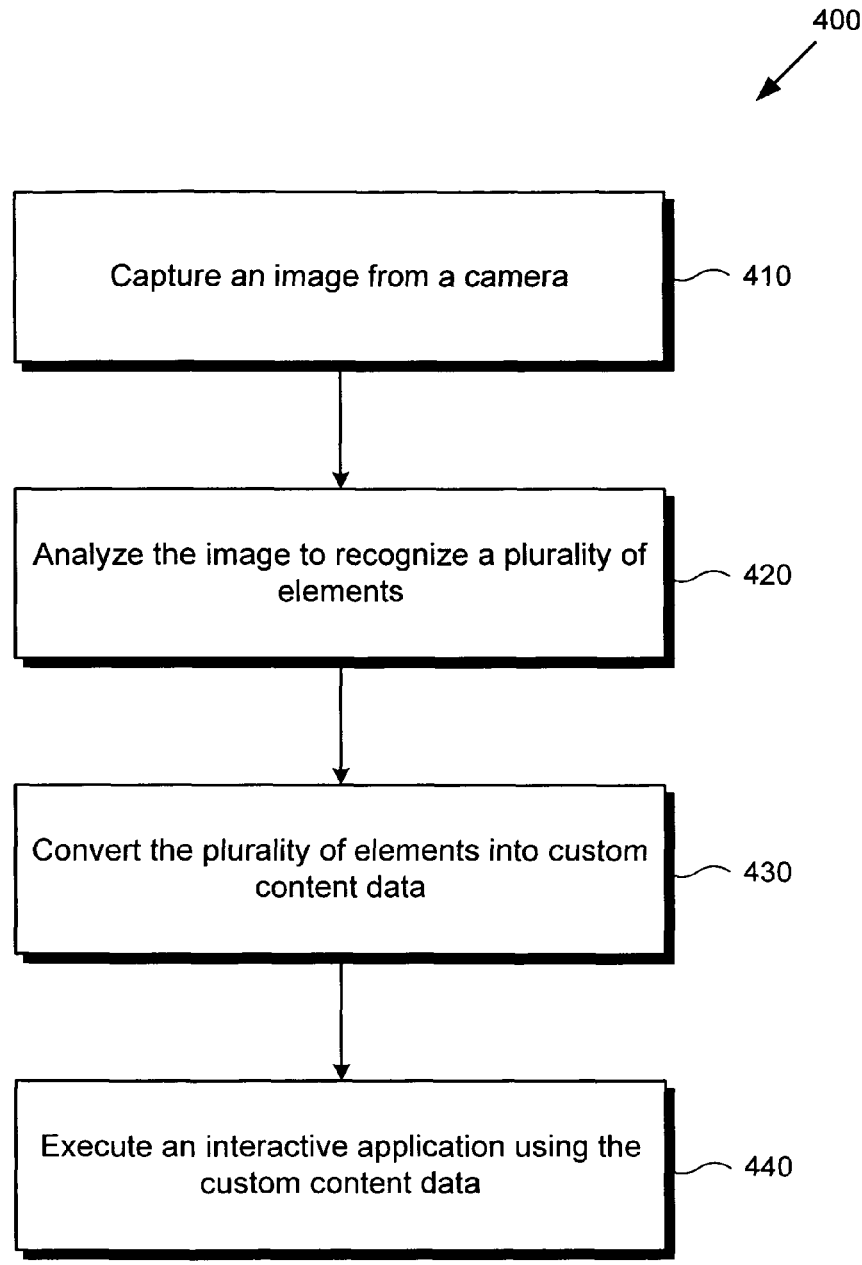
FIG. 4 shows a flowchart describing the steps, according to one embodiment of the present invention, by which image recognized content creation may be provided.

Moving to FIG. 4, FIG. 4 shows a flowchart describing the steps, according to one embodiment of the present invention, by which image recognized content creation may be provided. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises processor 111 of computing device 110 capturing an image of drawing 140 using camera 130. As previously described, drawing 140 may comprise a simple hand drawn closed circuit on a piece of paper, similar to that shown in drawing 340 of FIG. 3. Alternatively, drawing 140 may comprise an existing reference printed in a publication such as a magazine or shown a display such as a television or mobile phone screen.

Referring to step 420 of flowchart 400 in FIG. 4 and diagram 100 of FIG. 1, step 420 of flowchart 400 comprises processor 111 of computing device 110 analyzing the image captured from step 410 to recognize a plurality of elements. For example, examining drawing 340 in FIG. 3, circuit 345 may be broken down into a spline comprising line segments and Bezier curves. Alternatively, circuit 345 may be broken down into segments matching valid elements, for example by dividing portions of circuit 345 into several smaller areas and performing a closest match against valid elements listed by toolbar 221 in FIG. 2. Additionally, specific defined properties of the plurality of elements may be detected such as line thickness and foreground and background colors, as previously described.

Referring to step 430 of flowchart 400 in FIG. 4 and diagram 100 of FIG. 1, step 430 of flowchart 400 comprises processor 111 of computing device 110 converting the plurality of elements from step 420 into custom content data. For example, the spline or matched elements may be converted into a data structure defining a custom racetrack, suitable for loading into an interactive video game. The data structure may, for example, be implemented as a linked list or an array.

Referring to step 440 of flowchart 400 in FIG. 4 and diagram 100 of FIG. 1, step 440 of flowchart 400 comprises processor 111 of computing device 110 executing interactive application 115 using the custom content data from step 430. Thus, for example, interactive application 115 may comprise a racing game, where input device 135 comprises a gamepad or steering wheel and display 120 comprises a LCD display. Interactive application 115 may then allow the user to use input device 135 to race through the custom racetrack defined by the custom content data of step 430, wherein visuals of the game are output to display 120 and responsive to user input.

While a video game entertainment embodiment has been provided as one specific example of an interactive application, alternative embodiments may provide for other fields as productivity, education, and others where a facilitated method of custom content creation is desirable. In this manner, users can leverage common drawing skills to quickly and easily create custom content for various interactive applications, such as user-generated levels or tracks for video games. Advantageously, users can thus bypass the conventional requirement of learning to use complex, tedious, time intensive and proprietary content creation interfaces that may be different for each specific application.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A computing device providing image recognized content creation, the computing device comprising:
   a memory having a plurality of available data structures; and
   a processor configured to:
      capture an image from a camera;
      analyze the image to recognize a plurality of elements;
      apply a smoothing compensation to the plurality of elements, wherein the plurality of elements are matched to the plurality of available data structures in the memory;
      convert the plurality of elements into custom content data; and
      execute an interactive application using the custom content data to create a custom structure based on the plurality of available data structures in the memory for loading in the interactive application;
   wherein the plurality of elements comprise segments of a closed circuit track.

2. The computing device of claim 1, wherein the custom content data comprises a spline.

3. The computing device of claim 2, wherein the spline is defined using a linked list of line segments and Bezier curves.

4. The computing device of claim 1, wherein the processor is configured to execute the interactive application to provide a racing game using the custom content data as a racetrack.

5. The computing device of claim 1, wherein the processor is configured to capture the image from a drawing on paper.

6. The computing device of claim 1, wherein the plurality of elements includes defined symbols indicating properties of the custom content data.

7. The computing device of claim 1, wherein the plurality of elements includes attributes indicating properties of the custom content data.

8. The computing device of claim 7, wherein the attributes include foreground and background colors of the plurality of elements indicating terrain properties of the custom content data.

9. A method, for execution by a processor in a system including a memory having a plurality of available data structures, for providing image recognized content creation, the method comprising:
   capturing, by the processor, an image from a camera;
   analyzing, by the processor, the image to recognize a plurality of elements;
   applying, by the processor, a smoothing compensation to the plurality of elements, wherein the plurality of elements are matched to the plurality of available data structures in the memory;
   converting, by the processor, the plurality of elements into custom content data; and
   executing, by the processor, an interactive application using the custom content data to create a custom structure based on the plurality of available data structures in the memory for loading in the interactive application:
   wherein the plurality of elements comprise segments of a closed circuit track.

10. The method of claim 9, wherein the custom content data comprises a spline.

11. The method of claim 10, wherein the spline is defined using a linked list of line segments and Bezier curves.

12. The method of claim 9, wherein the executing, by the processor, further provides a racing game as the interactive application using the custom content data as a racetrack.

13. The method of claim 9, wherein the capturing, by the processor, of the image is from a drawing on paper.

14. The method of claim 9, wherein the plurality of elements includes defined symbols indicating properties of the custom content data.

15. The method of claim 9, wherein the plurality of elements includes attributes indicating properties of the custom content data.

16. The method of claim 15, wherein the attributes include foreground and background colors of the plurality of elements indicating terrain properties of the custom content data.

* * * * *